United States Patent
Perkins et al.

(10) Patent No.: US 9,273,439 B1
(45) Date of Patent: Mar. 1, 2016

(54) METHOD AND APPARATUS FOR ENSURING A MINIMUM BYPASS FLOW FROM A HYDROPOWER DIVERSION BOX

(71) Applicant: Little Green Hydro, LLC, Henniker, NH (US)

(72) Inventors: James C. Perkins, Henniker, NH (US); Robert K. Weir, Denver, CO (US)

( * ) Notice: Subject to any disclaimer, the term of this patent is extended or adjusted under 35 U.S.C. 154(b) by 173 days.

(21) Appl. No.: 14/216,677

(22) Filed: Mar. 17, 2014

Related U.S. Application Data

(60) Provisional application No. 61/792,906, filed on Mar. 15, 2013.

(51) Int. Cl.
*E02B 5/08* (2006.01)
*E02B 8/02* (2006.01)
*E02B 9/04* (2006.01)

(52) U.S. Cl.
CPC . *E02B 9/04* (2013.01); *E02B 5/085* (2013.01); *E02B 8/023* (2013.01)

(58) Field of Classification Search
CPC .............. E02B 5/08; E02B 5/085; E02B 8/02; E02B 8/023; E02B 8/06; E02B 9/02; E02B 9/04
USPC ........ 210/747.5, 162, 170.01; 405/75, 78, 80, 405/108, 127; 137/561 A
See application file for complete search history.

(56) References Cited

U.S. PATENT DOCUMENTS

| | | | | |
|---|---|---|---|---|
| 419,887 A | * | 1/1890 | Robinson | E03F 5/14 210/162 |
| 3,693,796 A | * | 9/1972 | Michel | E02B 8/023 210/170.1 |
| 4,303,350 A | * | 12/1981 | Dix | E03F 1/002 210/170.08 |
| 4,526,494 A | * | 7/1985 | Eicher | E02B 1/006 210/162 |
| 4,578,188 A | * | 3/1986 | Cousino | E03F 5/12 137/561 A |
| 6,503,392 B1 | * | 1/2003 | Tyson | C02F 1/006 137/561 A |
| 6,679,994 B1 | * | 1/2004 | Turco | E03F 5/12 210/162 |
| 7,022,243 B2 | * | 4/2006 | Bryant | E03F 5/12 210/162 |
| 7,300,590 B2 | | 11/2007 | Weir et al. | |
| 8,252,175 B2 | | 8/2012 | Weir | |
| 2010/0224570 A1 | * | 9/2010 | Feher | E02B 9/04 210/747.5 |

FOREIGN PATENT DOCUMENTS

DE 102010037223 * 3/2011

* cited by examiner

*Primary Examiner* — Christopher Upton
(74) *Attorney, Agent, or Firm* — The Reilly Intellectual Property Law Firm, P.C.

(57) ABSTRACT

A method and apparatus for ensuring a minimum bypass flow installed in a stream wherein a diversion chamber is defined by front, rear and side panels, a screen, a bypass chamber and a second outlet chamber that allows water to flow into the second chamber only when the flow of water is sufficient.

15 Claims, 4 Drawing Sheets

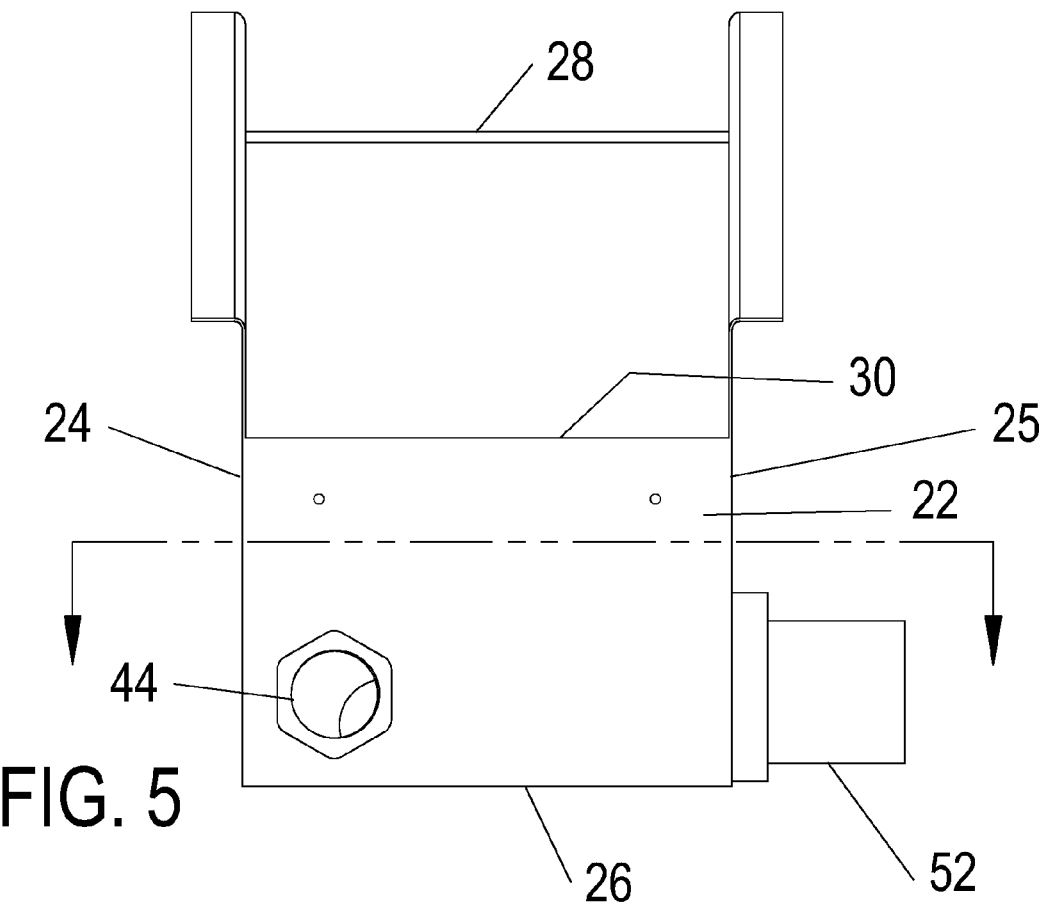
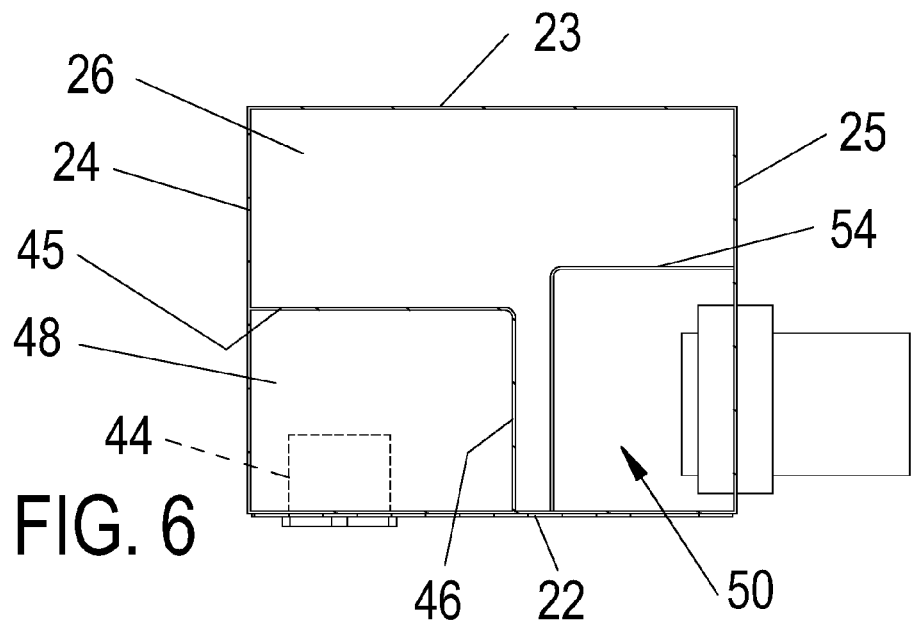

METHOD AND APPARATUS FOR ENSURING A MINIMUM BYPASS FLOW FROM A HYDROPOWER DIVERSION BOX

CROSS-REFERENCE TO RELATED APPLICATIONS

This application claims the benefit of U.S. Provisional Application No. 61/792,906 filed Mar. 15, 2013 for METHOD AND APPARATUS FOR ENSURING A MINIMUM BYPASS FLOW FROM A HYDROPOWER DIVERSION BOX and is incorporated by reference herein.

BACKGROUND AND FIELD

Standard diversion boxes are widely used to divert water from watercourses for water supply systems and hydroelectric power generation. Hydroelectric diversion boxes can divert a significant portion of the watercourse flow into a penstock (pipe) through which the water is conveyed to energize a turbine/generator to create electric power. The remaining, and often smaller, portion of the watercourse flow passes over the diversion box and downstream in the watercourse and is referred to as the "bypass flow." Maintaining an adequate bypass flow is important because when the bypass flow falls below a specified volume, negative environmental impacts result to the riverine ecosystem and its aquatic life.

During periods of reduced natural water flow in a watercourse, such as that which occurs in summer drought periods, in a standard diversion box the bypass flow is reduced because the natural water flow has diminished but the water flow diverted to the penstock by the diversion box remains static. As a result, reduced natural water flow in the stream may reduce the health of the riverine ecosystem.

The present apparatus enhances the functionality of the standard diversion box by ensuring that the bypass flow will meet or exceed a specified volume and thus provide minimum bypass flow levels required to maintain healthy riverine ecosystems. As described herein, the present method and apparatus is designed such that the bypass flow takes precedence over flow diverted for hydropower generation and therefore ensures that minimum bypass flows are maintained to support the health of riverine ecosystems.

There is described herein an apparatus for ensuring a minimum bypass flow installed in a stream, having a diversion chamber having dual parallel side panels extending upwardly from outer edges of a floor panel and front and rear panels of varying height, a tilted wire wedge wire screen inclining downwardly and mounted between the side panels and the front and rear panels, a bypass chamber mounted within the diversion chamber having a bypass inlet and a bypass outlet, and a secondary chamber mounted within the diversion chamber and including an outlet port. The bypass chamber being defined by isolation walls, and the second outlet chamber mounted within the diversion box having second isolation walls with an open upper end and a penstock port, the second isolation walls being higher than the bypass inlet so that water flows into the second chamber only when the water level is above the second isolation walls. There is also provided a method of ensuring minimum bypass flow levels in a stream.

DETAILED DESCRIPTION OF DRAWINGS

FIG. 5 is a front view in elevation of the unit with the screen removed;

FIG. 6 is another cross-sectional view taken about lines 6-6 of FIG. 5; and

DETAILED DESCRIPTION

Figure 1:
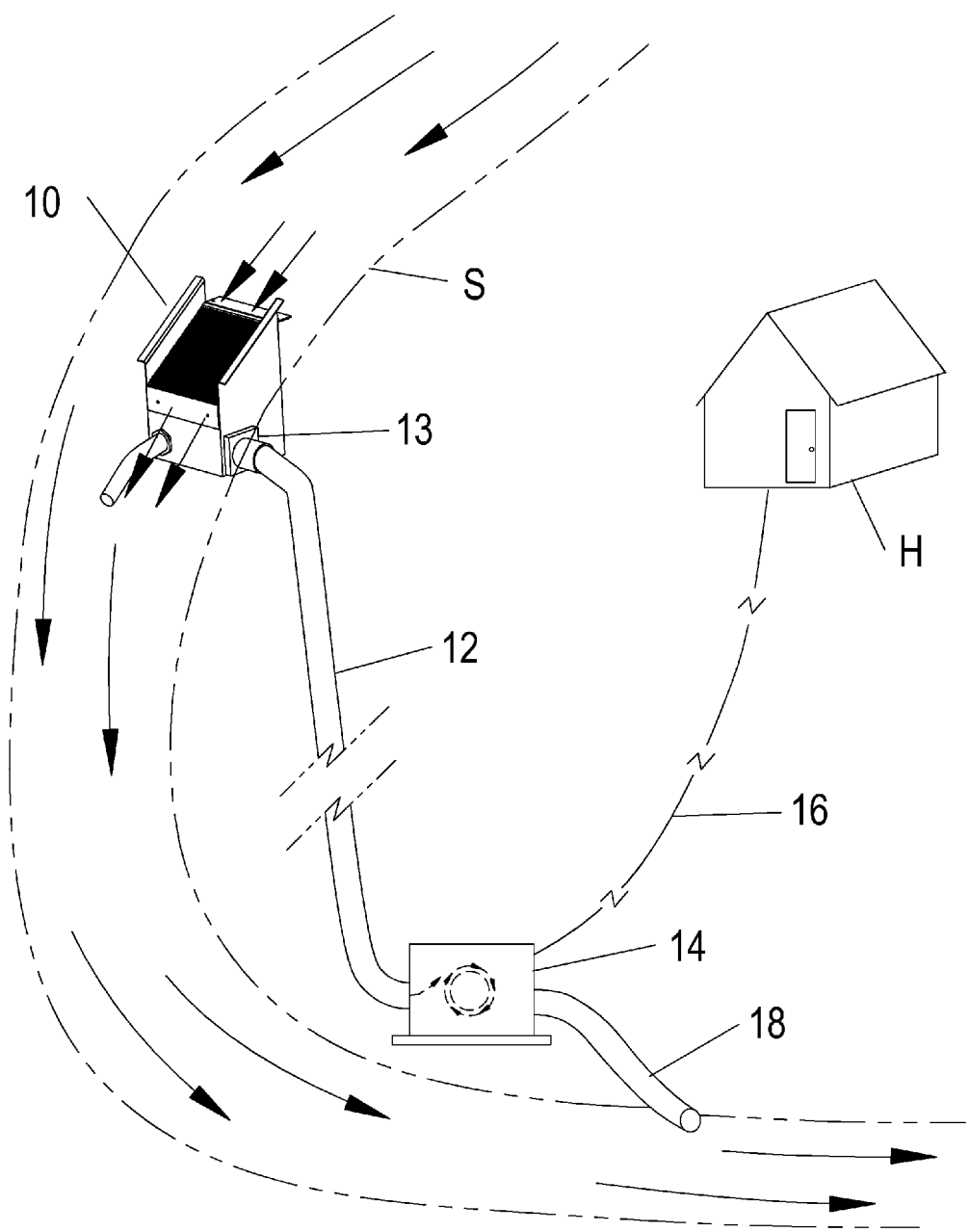
FIG. 1 is a somewhat schematic view illustrating an intake unit containing a diversion box and penstock flow feature for conveying water into a turbine/generator.

As a setting for the present apparatus, there is illustrated in FIG. 1 a microhydro system which is typically installed in a stream as designated at S, the system comprising a diversion or intake box 10 at an upper level of the stream S having a penstock in the form of an elongated tubular section or pipeline 12 from an outlet 13 in the diversion box 10 into a turbine/generator 14 located at a lower elevation of the diversion box 10. In this case, the particular turbine/generator 14 employed is commonly referred to as a microhydro turbine/generator which is capable of delivering from 0.5 to 50 kilowatts of electrical power. One commercial form of turbine/generator is the EcoHydro System™, manufactured and sold by Little Green Hydro, LLC of Hanover, N.H.

The EcoHydro System turbine/generator 14 has an electrical cable as indicated at 16 to direct electrical energy from the generator into a user facility such as a home, business or farm designated at H. The generator 14 is installed at a point downstream so as to have a difference in elevation or "head" beneath the diversion unit 10 to enable the flow of water under pressure via the penstock 12 from the diversion unit to operate the turbine generator 14. A tail rack 18 returns the water flowing through the generator 14 back into the stream S as illustrated. It will be apparent that the diversion box 10 may be utilized in conjunction with splitters, not shown, to direct water flow through two or more penstock lines to a plurality of turbine/generators 14 located downstream of the diversion box.

Figure 2:
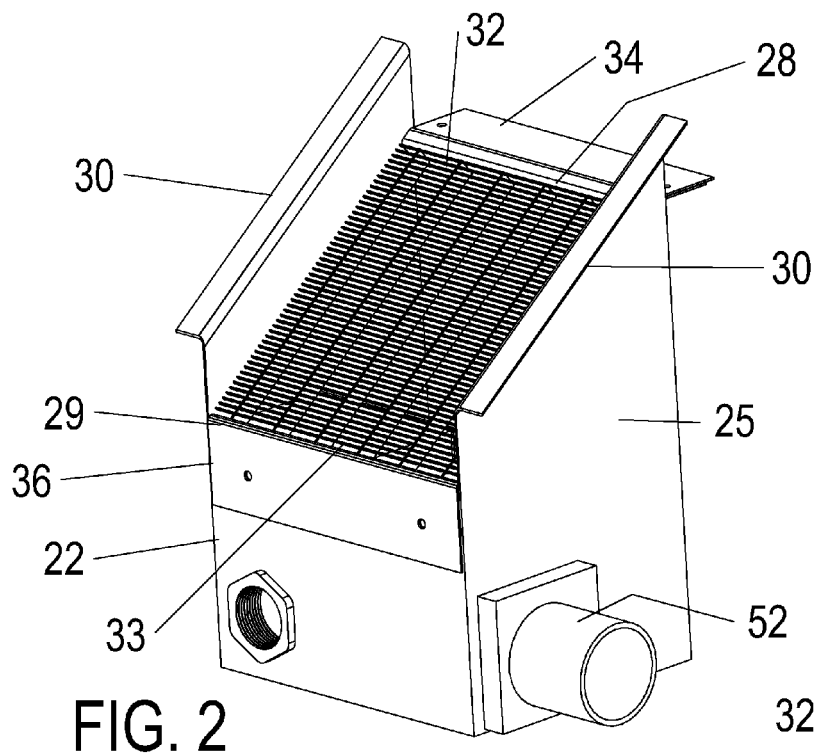
FIG. 2 is an enlarged perspective view of the form of diversion box illustrated in FIG. 1.
Figure 3:
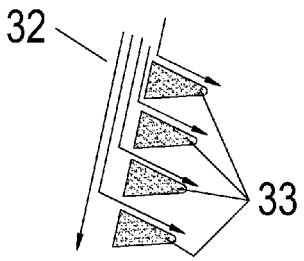
FIG. 3 is a cross-sectional view of a tilted wire wedge wire screen.
Figure 4:
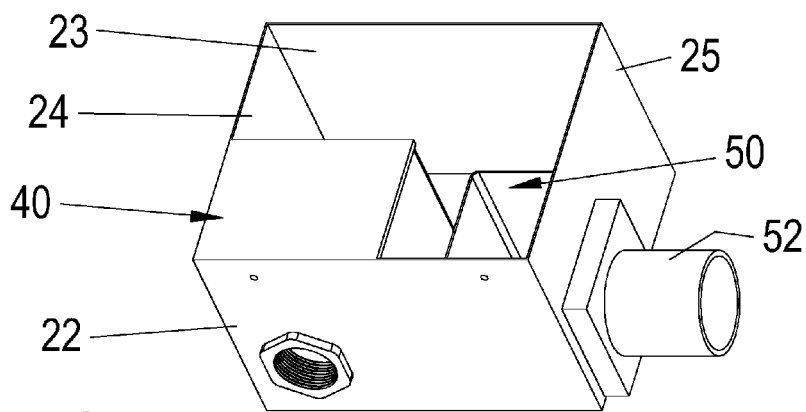
FIG. 4 is a perspective view illustrating the interior of the unit shown in FIGS. 1 & 2.

As shown in FIGS. 2-7, one form of diversion box 10 is comprised of a chamber or box having front and rear panels 22 and 23, respectively, and opposite side panels 24 and extending upwardly from outer edges of a bottom or floor panel 26. The rear panel 23 is higher than the front panel 22 and terminates in an upper horizontal edge 28 above an upper horizontal edge 29 of the front panel 22. In turn, the side panels 24 and 25 are of the same size and terminate in upper inclined edges 30 which extend downwardly from opposite ends of upper edge 28 of the rear panel to upper edge 29 of the front panel 22. All of the panels may be of sheet metal or aluminum construction and with the adjoining edges rigidly interconnected to one another so as to define an upper inclined open support along the upper edges for mounting of a filter or screen 32. Preferably the screen 32 is a tilted wire wedge wire screen with individual wedge wires 33 at an angle, preferably on the order of 5°, as shown in FIG. 3 which will direct a selected amount of the water flowing over the screen into the interior of the box 10.

Figure 7:
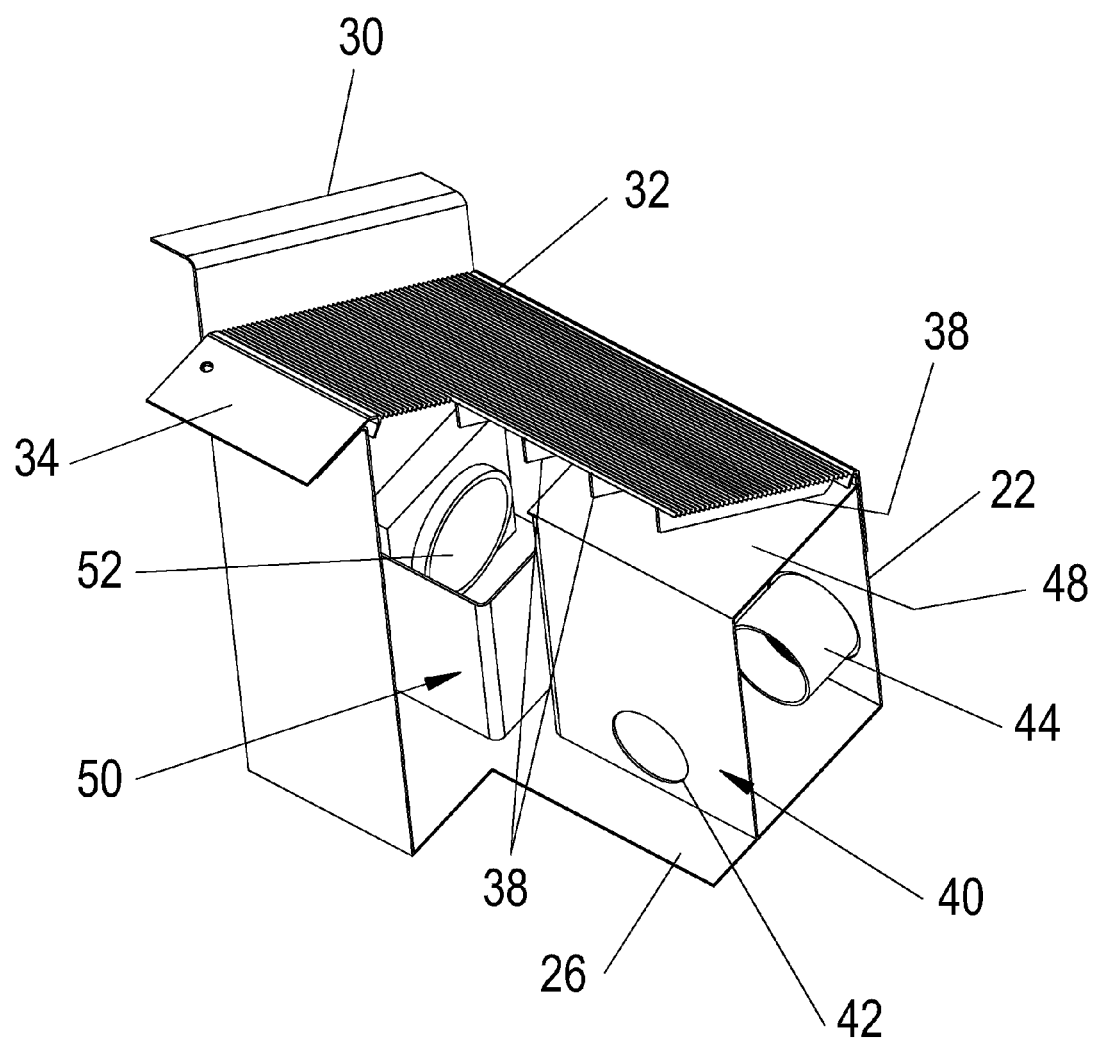
FIG. 7 is a cut-away rear perspective view of the interior of the diversion box.

The screen 32 is dimensioned to cover the entire upper open end of the box 10 and has an upper curved lip 34 in overhanging relation to the upper edge 28 of the rear panel 22. The lower end of the screen has an extension 36 overhanging the upper edge 29 of the front panel 23 as shown in FIG. 2. The screen is supported by braces 38, as shown in FIG. 7 between the side panels 24 and 25 so as to rigidify the assembly of the screen to the box and maintain the screen at a slope or inclination on the order of preferably 30° to 45°. The extension plate 36 at the lower end of the screen 32 is in overhanging relation to the front panel 22 so that debris which collects on the self-cleaning screen will continue to advance downwardly with the water flowing over the top of the screen 32 into the stream.

A bypass chamber 40 is mounted in one lower front corner of the diversion box beneath the screen 32 and has a bypass inlet 42 in a rear isolation wall 45 above the bottom panel 26, and a bypass outlet 44 in the front panel 22 of the diversion box communicates with the interior of the bypass chamber 40 as shown in FIG. 7. The bypass chamber itself is defined by isolation walls 45 and 46 at right angles to one another and joined to the front panel 22 and side panel 24. The isolation wall panels 45 and 46 extend upwardly for the greater length or height of the panels 22 and 24 to which is attached a cover plate 48. A second outlet chamber 50 for a penstock outlet port 52 is mounted in the sidewall 25, and a 3-sided or generally U-shaped vertical wall 54 is mounted in surrounding relation to the outlet port 52, the chamber being open at its upper end as shown in FIG. 6. The wall 54 extends upwardly from the bottom panel 25 for a distance greater than the height of the bypass inlet 42 in order to regulate or control the relative amounts of water passing through the bypass chamber in relation to that utilized for the penstock flow during periods of low stream flow as hereinafter discussed in more detail.

Accordingly, in operation, and by reference to FIG. 1, the diversion box 10 is positioned in the stream S so that the screen 32 is positioned in the path of flow of the stream and the interior of the diversion box 10 will collect a portion of the water flow passing over the screen 32 into the interior of the box. The water influx will be divided between flow via the bypass chamber 40 through the bypass port 44 and the penstock port 52. In addition, a portion of the water passing over the screen 32 will carry with it any debris which has collected on the screen. The greater amount of water under normal conditions which passes through the screen 32 will be directed through the bypass chamber 40 and returned into the stream S as bypass flow; and as long as the water level in the box is maintained above the isolation wall 54 surrounding the penstock port, water will flow through the penstock port and into pipeline 12 to operate the turbine/generator 14.

A particular feature of maintenance of the bypass flow by this method and apparatus is that in periods of reduced natural water flows in a watercourse, such as may occur in summer drought periods, this embodiment ensures that the minimum specified volume of bypass flow will be met prior to water flow being diverted through the penstock port for hydropower generation, which has the highly beneficial effect of supporting the health of the riverine ecosystem.

Although one embodiment is herein set forth and described, the above and other modifications and changes may be made as well as their intended application for uses other than described without departing from the spirit and scope of the present method and apparatus.

We claim:

1. An apparatus for providing minimum bypass flow in a stream wherein a turbine/generator is located downstream, the apparatus comprising:
    a diversion chamber having dual parallel side panels extending upwardly from outer edges of a floor panel and opposing front and rear panels;
    a tilted wire wedge wire screen inclining downwardly and mounted between said side panels and said front and rear panels;
    a bypass chamber mounted within said diversion chamber having a bypass inlet and a bypass outlet; and
    a secondary chamber mounted within said diversion chamber having an inlet above said bypass inlet and including an outlet port.

2. The apparatus according to claim 1 wherein said side panels terminate in upper inclined edges.

3. The apparatus according to claim 1 wherein said screen is supported by brace members.

4. The apparatus according to claim 1 wherein said bypass chamber is defined by dual isolation walls mounted at right angles to one another and extending upwardly for the height of said front panel and to an equivalent height of one of said side panels.

5. The apparatus according to claim 1 wherein said secondary chamber includes a generally U-shaped vertical wall mounted in surrounding relation to said outlet port.

6. The apparatus according to claim 5 wherein said vertical wall extends upwardly from said floor panel for a distance greater than the height of said bypass inlet.

7. An apparatus for ensuring a minimum bypass flow installed in a stream, the apparatus comprising:
    a diversion box having front and rear panels and opposite side panels extending upwardly from outer edges of a floor panel;
    said rear panel terminating in an upper horizontal edge positioned above an upper horizontal edge of said front panel;
    said side panels terminating in upper inclined edges and having a screen mounted thereupon;
    a bypass chamber mounted within said diversion box having a bypass inlet and a bypass outlet; and
    a second outlet chamber having an inlet above said bypass inlet mounted within said diversion box.

8. The apparatus according to claim 7 wherein said upper inclined edges extend downwardly from opposite ends of said rear panel upper edge to said front panel upper edge.

9. The apparatus according to claim 7 wherein said panels have adjoining edges rigidly interconnected to one another so as to define an upper inclined open support for mounting of said screen.

10. The apparatus according to claim 7 wherein said screen comprises tilted wire wedge wire.

11. The apparatus according to claim 7 wherein said bypass chamber being defined by isolation walls.

12. The apparatus according to claim 11 wherein said second outlet chamber includes second isolation walls with an open upper end and a penstock port.

13. The apparatus according to claim 12 wherein said second isolation walls being higher than said bypass inlet so that water flows into said second chamber only when the water level is above said second isolation walls.

14. A method of ensuring minimum bypass flow levels in a stream, the steps comprising;
    positioning a diversion box in a flowing body of water;
    passing a portion of the water flow over a screen and into said diversion box;
    collecting said water portion passing through said diversion box;
    dividing said water portion between a bypass port and a penstock port; and
    diverting water flow through said penstock port only when the water level is above said bypass port.

15. The method according to claim 14 including the step of splitting diverted water flow from said penstock port through two or more penstock lines.

* * * * *